(12) United States Patent
Kim (10) Patent No.: US 8,958,134 B2
(45) Date of Patent: Feb. 17, 2015

(54) IMAGE ARRAY WITH LOCALIZED LIGHT SOURCE

(76) Inventor: Moon J. Kim, Wappingers Falls, NY (US)

( * ) Notice: Subject to any disclaimer, the term of this patent is extended or adjusted under 35 U.S.C. 154(b) by 711 days.

(21) Appl. No.: 13/109,245

(22) Filed: May 17, 2011

(65) Prior Publication Data

US 2012/0293847 A1 Nov. 22, 2012

(51) Int. Cl.
| | |
|---|---|
| H04N 1/04 | (2006.01) |
| H04N 1/195 | (2006.01) |
| H04N 1/40 | (2006.01) |
| H04N 5/235 | (2006.01) |

(52) U.S. Cl.
CPC ........... *H04N 1/195* (2013.01); *H04N 1/40056* (2013.01); *H04N 5/2354* (2013.01)
USPC ............ 358/475; 358/482; 358/486; 358/474

(58) Field of Classification Search
USPC ......... 358/471, 474, 494, 496, 475, 509, 505, 358/514, 473, 442, 483, 482, 486; 382/312, 382/313
See application file for complete search history.

(56) References Cited

U.S. PATENT DOCUMENTS

| | | | | |
|---|---|---|---|---|
| 5,036,397 | A * | 7/1991 | Nagabusa | 348/311 |
| 5,377,022 | A * | 12/1994 | Street et al. | 358/498 |
| 5,467,403 | A | 11/1995 | Fishbine et al. | |
| 5,640,251 | A * | 6/1997 | Tone et al. | 358/482 |
| 6,178,255 | B1 | 1/2001 | Scott et al. | |
| 6,212,290 | B1 | 4/2001 | Gagne et al. | |
| 6,215,553 | B1 * | 4/2001 | Rider et al. | 356/630 |
| 6,606,171 | B1 * | 8/2003 | Renk et al. | 358/475 |
| 6,628,813 | B2 | 9/2003 | Scott et al. | |
| 6,690,493 | B1 * | 2/2004 | Kobayashi et al. | 358/482 |
| 6,938,823 | B2 | 9/2005 | Boccacci | |
| 6,989,916 | B2 * | 1/2006 | Lichtfuss | 358/474 |
| 7,034,969 | B2 * | 4/2006 | Watanabe | 358/513 |
| 7,362,478 | B2 * | 4/2008 | Mangerson | 358/474 |
| 7,548,351 | B2 * | 6/2009 | Imai et al. | 358/474 |
| 7,672,024 | B2 * | 3/2010 | Kuan | 358/482 |
| 7,786,868 | B2 | 8/2010 | Forster | |
| 7,787,161 | B2 * | 8/2010 | Oyama | 358/498 |
| 7,814,332 | B2 | 10/2010 | Beenau et al. | |
| 8,020,861 | B2 * | 9/2011 | Itabashi et al. | 271/258.01 |
| 8,020,862 | B2 * | 9/2011 | Oyama et al. | 271/265.01 |
| 8,149,473 | B2 * | 4/2012 | Oshida et al. | 358/474 |
| 8,172,226 | B2 * | 5/2012 | Murakami et al. | 271/264 |
| 2006/0170530 | A1 | 8/2006 | Nwosu et al. | |
| 2006/0202032 | A1 | 9/2006 | Kricorissian | |
| 2006/0224504 | A1 | 10/2006 | Nwosu et al. | |
| 2007/0033150 | A1 | 2/2007 | Nwosu | |
| 2007/0257115 | A1 * | 11/2007 | Knowles et al. | 235/462.42 |
| 2007/0285244 | A1 | 12/2007 | Tucker et al. | |
| 2008/0040274 | A1 | 2/2008 | Uzo | |
| 2008/0180249 | A1 | 7/2008 | Butler et al. | |
| 2008/0278325 | A1 | 11/2008 | Zimman et al. | |
| 2009/0085750 | A1 | 4/2009 | Waldner et al. | |

(Continued)

*Primary Examiner* — Cheukfan Lee
(74) *Attorney, Agent, or Firm* — Hunter E. Webb; Keohane & D'Alessandro, PLLC (57) ABSTRACT

Embodiments of the present invention provide lighting for an image array. Specifically, embodiments of the present invention provide a system and method for providing localized lighting for an image array. In a typical embodiment, a set of pixels being scanned in the image array is identified. A subset of light sources within an array of light sources that corresponds to the set of pixels is engaged. After the pixels have been scanned, the subset of light sources is disengaged.

21 Claims, 9 Drawing Sheets

(56) References Cited

U.S. PATENT DOCUMENTS

| | | |
|---|---|---|
| 2009/0289773 A1 | 11/2009 | Hoyt et al. |
| 2010/0082444 A1 | 4/2010 | Lin et al. |
| 2010/0201488 A1 | 8/2010 | Stern et al. |
| 2013/0044337 A1* | 2/2013 | Yoshida .......................... 358/1.9 |

* cited by examiner

IMAGE ARRAY WITH LOCALIZED LIGHT SOURCE

FIELD OF THE INVENTION

In general, the present invention relates to image arrays. Specifically, the present invention relates to using a localized light source for an image array.

BACKGROUND OF THE INVENTION

Efficient energy use has become an important topic in recent years. Efficient usage of energy can result in a multitude of benefits, including financial benefits such as cost savings and environmental benefit such as preservation of natural resources and reduced environmental impact.

An imager is an electronic or other device that records images of something. Current imagers typically acquire images using a single and coherent operating light source for image illumination. This approach takes extensive power to maintain across all pixels while scanning is progressing by pixel or column. A bright and consistent light source is necessary for quality results. However, only the pixels currently being scanned requires light source. Therefore, there is a problem in the typical imager in that the light source for image illumination is inefficiently managed.

SUMMARY OF THE INVENTION

In general, embodiments of the present invention provide lighting for an image array. Specifically, embodiments of the present invention provide a system and method for providing localized lighting for an image array. In a typical embodiment, a set of pixels being scanned in the image array is identified. A subset of light sources within an array of light sources that corresponds to the set of pixels is engaged. After the pixels have been scanned, the subset of light sources is disengaged.

A first aspect of the present invention provides a method for providing localized lighting for an image array, comprising: identifying a set of pixels being scanned in the image array; selectively engaging a subset of light sources within an array of light sources that corresponds to the set of pixels; and disengaging the subset of light sources when the set of pixels has been scanned.

A second aspect of the present invention provides an imager device having localized lighting in an image array, comprising: an image array having a plurality of pixels arranged in rows and columns; an array of light sources; an integrated circuit controller configured to identify a set of pixels being scanned in the image array; selectively engage a subset set of light sources within an array of light sources that corresponds to the set of pixels; and disengage the subset of light sources when the set of pixels have been scanned.

A third aspect of the present invention provides a method for providing an imager device having localized lighting in an image array, comprising: providing an image array having a plurality of pixels arranged in rows and columns; providing an array of light sources; providing an integrated circuit controller configured to identify a set of pixels being scanned in the image array; selectively engage a subset set of light sources within an array of light sources that corresponds to the set of pixels; and disengage the subset of light sources when the set of pixels has been scanned.

A fourth aspect of the present invention provides an illumination system, comprising: an array of light sources configured to provide illumination; a two-dimensional imager configured to image an area and produce image data; and a controller coupled to receive the image data from the imager, the controller configured to process the image data, and the controller configured to control the array of light sources.

A fifth aspect of the present invention provides a method for providing an illumination system, comprising: providing an array of light sources configured to provide illumination; providing a two-dimensional imager configured to image an area and produce image data; and providing a controller coupled to receive the image data from the imager, the controller configured to process the image data, and the controller configured to control the array of light sources.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Further-more, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In the context of light systems, efficient energy usage by a lighting system is perhaps most effectively accomplished by eliminating the illumination level when an illumination level is not needed. This can be achieved by an automatic control mechanism that adjusts the illumination level based on the pixels being scanned. A structured illumination source that is dynamically controllable alleviates many of the power consumption concerns.

An imager consists of an array of pixels arranged in rows and columns. An imager begins by illuminating the target image with a light source. When a pixel or column of pixels is being scanned, an image sensor (photodetector) detects the reflected light from the illumination system and generates an analog signal with varying voltage that represents the intensity (or lack of) of the reflection. An analog-to-digital converter converts the analog signal to a digital signal which is then used to store or recreate the image.

As indicated above, embodiments of the present invention provide lighting for an image array. Specifically, embodiments of the present invention provide a system and method for providing localized lighting for an image array. In a typical embodiment, a set of pixels being scanned in the image array is identified. A subset of light sources within an array of light sources that corresponds to the set of pixels is engaged. After the pixels have been scanned, the subset of light sources is disengaged.

Figure 1A:
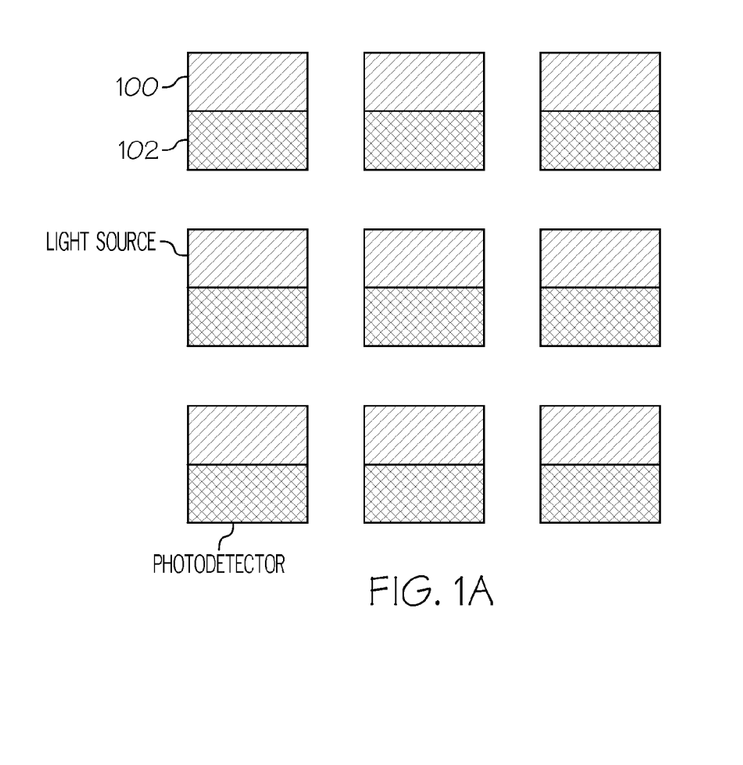
FIGS. 1A-B depict a light source and photodetector arrangement having a 1 to 1 (1:1) relationship according to an embodiment of the present invention.
Figure 1B:
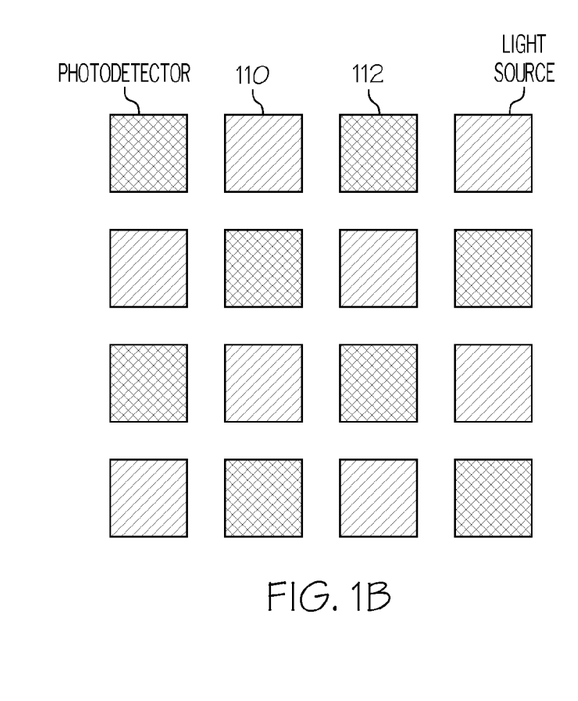

Referring now to FIGS. 1A-B, a light source and sensor (photodetector) arrangement having a 1 to 1 (1:1) relationship according to an embodiment of the present invention is depicted. Highlighted in each of FIGS. 1A-B is an arbitrary subset of pixels within the image array having 4 rows and 4 columns. Each pixel is constructed the same and includes a photodetector receiving light from a light source and generating an output. FIG. 1A depicts a light source and photodetector arrangement having a 1 to 1 (1:1) relationship in which light source 100 is placed above photodetector 102. FIG. 1B depicts a light source and photodetector arrangement having a 1:1 relationship in which light source 110 is adjacent to photodetector 112.

Figure 2:
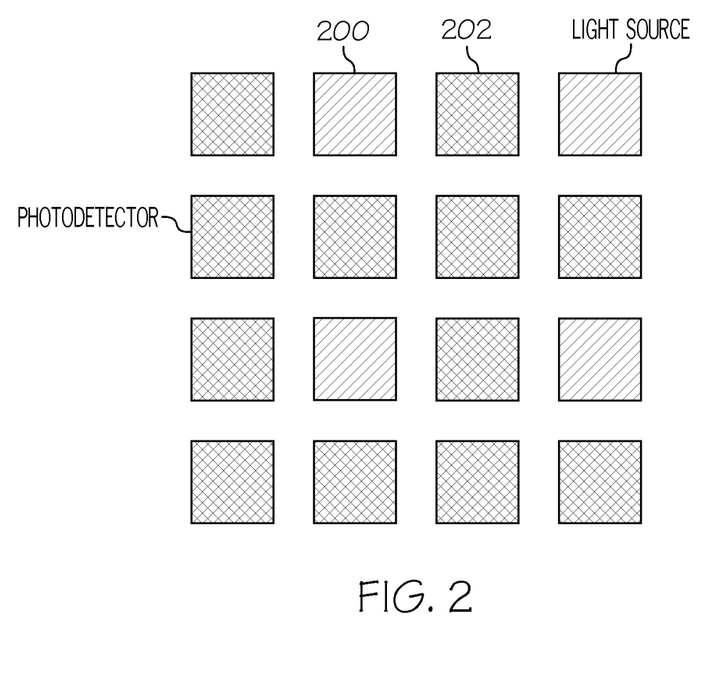
FIG. 2 depicts a light source and photodetector arrangement having a 1 to many (1:M) relationship according to an embodiment of the present invention.

FIG. 2 depicts a light source and sensor (photodetector) arrangement having a 1 to many (1:M) relationship according to an embodiment of the present invention. In rows 1 and 3 of the image array, a light source (e.g., light source 200) is in column 2 along with a light source in column 4. Rows 2 and 4 contain only photodetectors (e.g., photodetector 202).

Figure 3A:
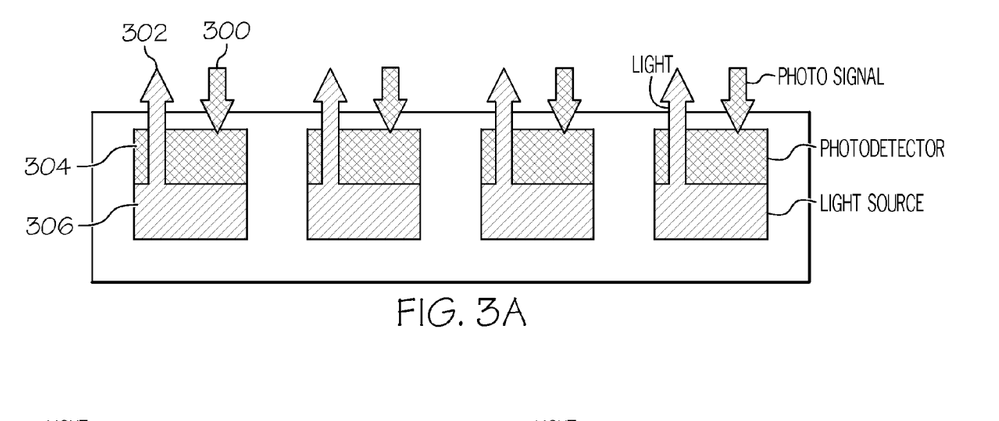
FIGS. 3A-D depict a vertical light source and photodetector arrangement having a 1 to 1 (1:1) relationship according to an embodiment of the present invention.
Figures 3B, 3C, 3D:
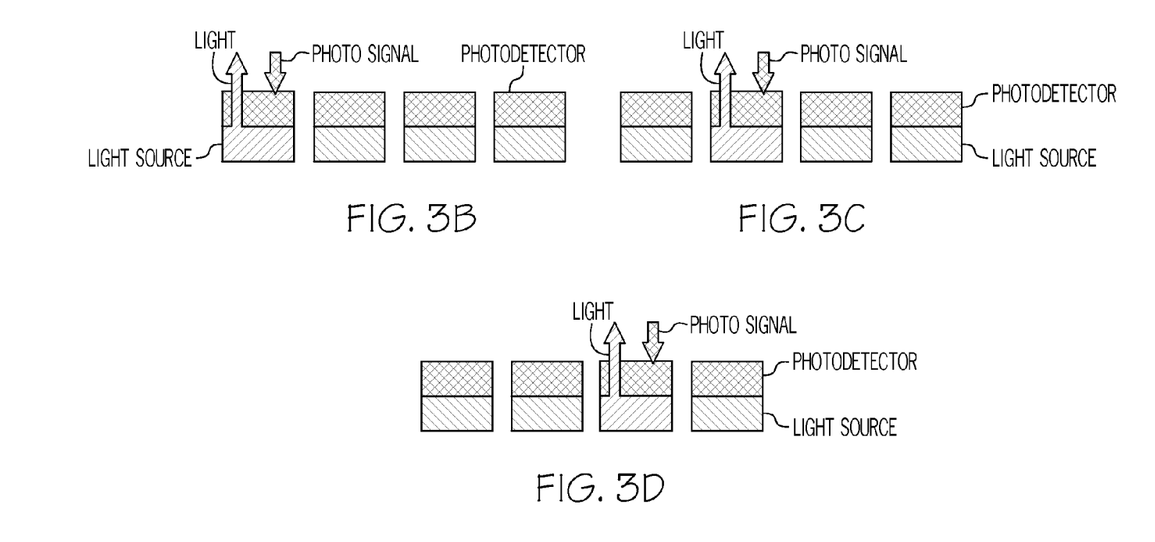

FIGS. 3A-D depict a vertical light source and sensor (photodetector) arrangement having a 1 to 1 (1:1) relationship according to an embodiment of the present invention. In FIG. 3A, a single row of an image array is shown. Each pixel includes a photodetector (e.g., photodetector 304) and light source (e.g., light source 306). Photo signal 300 is shown along with light 302. Photodetector 304 is transparent. Light source 306 is placed below photodetector 304. Light source 306 is turned on (engaged) only when photodetector 304 is scanning. Light source 306 produces light 302. When scanning, the illuminated photo signal 300 is captured by photodetector 304. After scanning, light source 306 is turned off (disengaged). FIGS. 3B-D depict light sources being turned on as their corresponding photodetector is in the process of scanning. Again, after the photodetector has completed scanning, the corresponding light source is turned off.

Figure 4A:
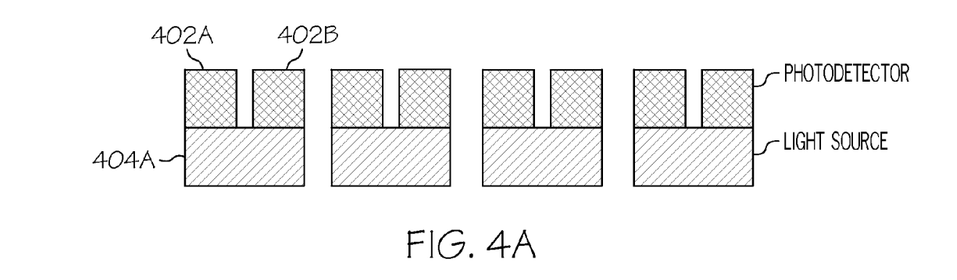
FIGS. 4A-D depict a vertical light source and photodetector arrangement having a 1 to many (1:M) relationship according to an embodiment of the present invention.
Figures 4B, 4C, 4D:
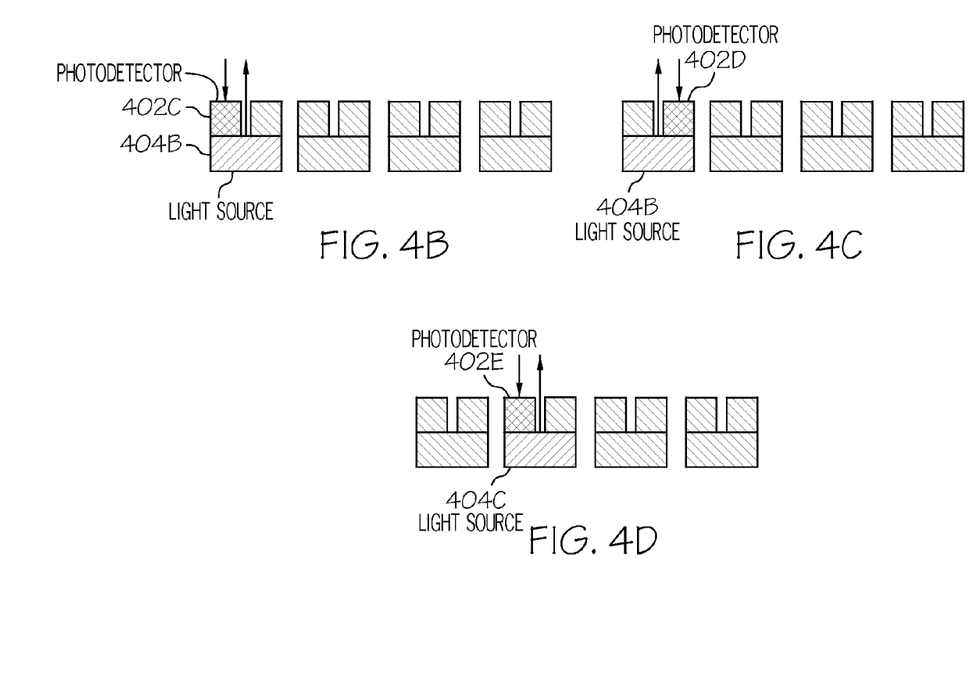

FIGS. 4A-D depict a vertical light source and sensor (photodetector) arrangement having a 1 to many (1:M) relationship according to an embodiment of the present invention. Highlighted is FIG. 4A showing a row in the image array having multiple (in this case, two) photodetectors sharing one light source. The first entry in the image array has photodetectors 402A-B and light source 404. FIGS. 4B-D illustrate how the single light source for the two photodetectors is turned on while each of the two photodetectors performs its scanning function. In FIG. 4B, light source is turned 404B is turned on while photodetector 402C is scanning. In FIG. 4C, light source is turned 404B is still on while photodetector 402D is scanning. In FIG. 4D, light source is turned 404C is turned on while photodetector 402E is scanning. After each of the photodetectors corresponding to the single light source has completed its scanning function, the light source is turned off.

Figure 5A:
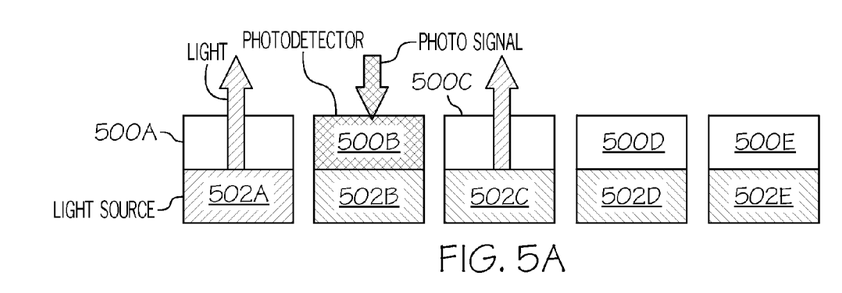
FIGS. 5A-C depict illumination by surrounding light sources according to an embodiment of the present invention.
Figure 5B:
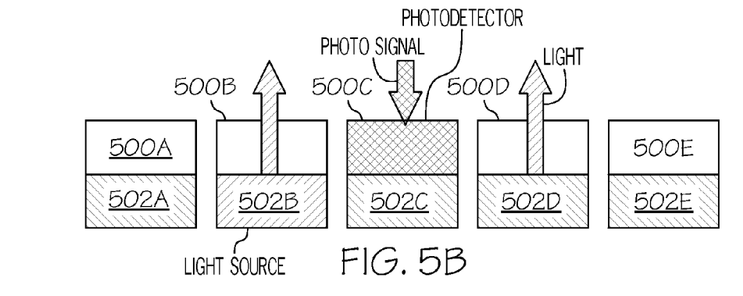
Figure 5C:
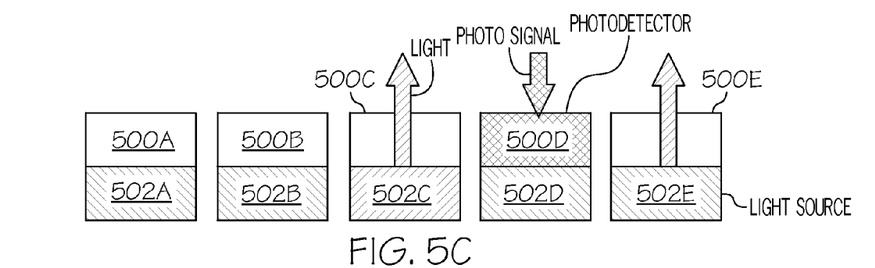

FIGS. 5A-C depict illumination by surrounding light sources according to an embodiment of the present invention. In FIG. 5A, when photodetector 500B is scanning, light source 502A and light source 502C are illuminated. In FIG. 5B, when photodetector 500C is scanning, light source 502B and light source 502D are illuminated. In FIG. 5C, when photodetector 500D is scanning, light source 502C and light source 502E are illuminated. After each scanning function is completed, the corresponding light source is turned off to save energy consumption.

Figure 6:
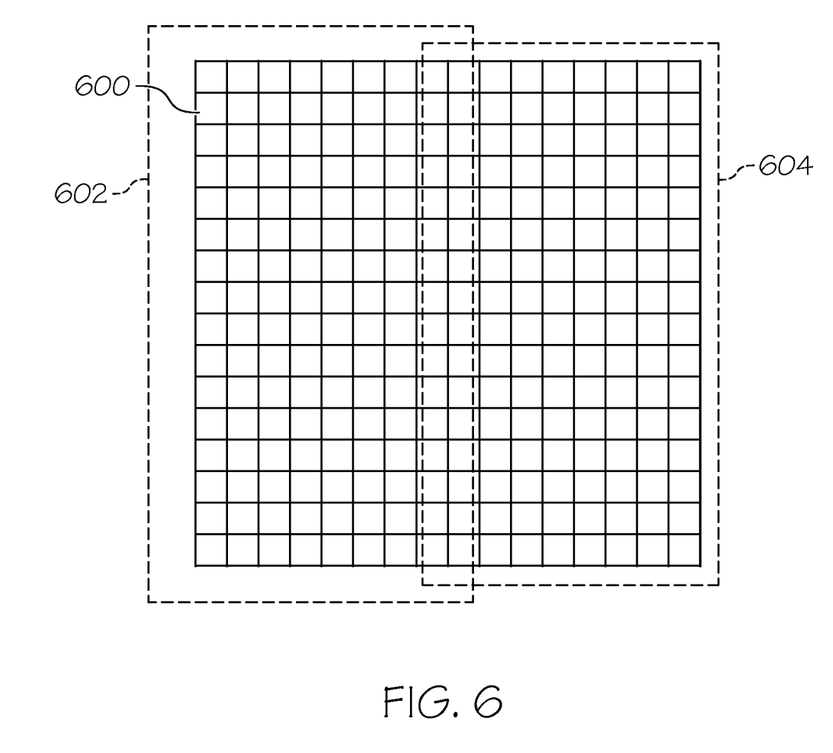
FIG. 6 depicts an image array having two light sources according to an embodiment of the present invention.

FIG. 6 depicts an image array having two light sources according to an embodiment of the present invention. In an extreme case, an image array may have only two light sources. Light source 1 602 and Light source 2 604 are both engaged in such a way as to ensure that the pixel(s) being scanned within sensory array 600 are being lighted with both light sources.

Figure 7:
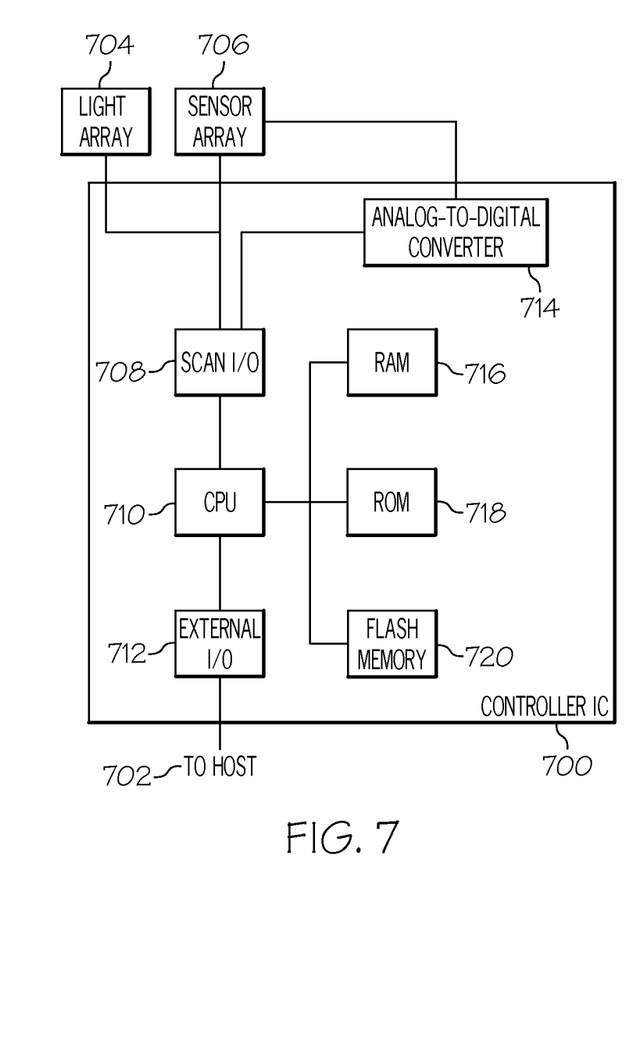
FIG. 7 depicts a control IC (integrated circuit) block diagram according to an embodiment of the present invention.

FIG. 7 depicts a controller IC (integrated circuit) block diagram according to an embodiment of the present invention. Controller integrated circuit (IC) 700 is coupled to host 702. Light array 704 and sensor array 706 are coupled to controller IC 700. Controller IC 700 includes scan input/output (I/O) 708, central processing unit (CPU) 710, external I/O 712; memories RAM 716, ROM 718, and flash memory 720. ADC 714 is coupled to sensor array 706. Scan I/O 708 is coupled to light array 704, sensor array 706, and ADC 714. CPU 710 is coupled to scan I/O 708 and memories RAM 716, ROM 718, and flash memory 720. External I/O 712 is coupled to CPU 710.

Controller IC 700 indentifies the set (at least one) of pixels being scanned in the image array. Controller IC 700 controls light array 704. Controller IC 700 controls engaging the subset of light sources within an array of light sources that corresponds to the set of pixels being scanned. Controller IC 700 controls sensor array 706. When a pixel or column of pixels is being scanned, sensor array 706 detects the reflected light from the illumination system and generates an analog signal with varying voltage that represents the intensity (or lack of) of the reflection. Scan I/O 708 receives the analog signal and transmits it to ADC 714. ADC 714 converts the analog signal to a digital signal. CPU 710 uses the digital signal to store or recreate the image which is sent to host 702 via external I/O 712.

Figure 8A:
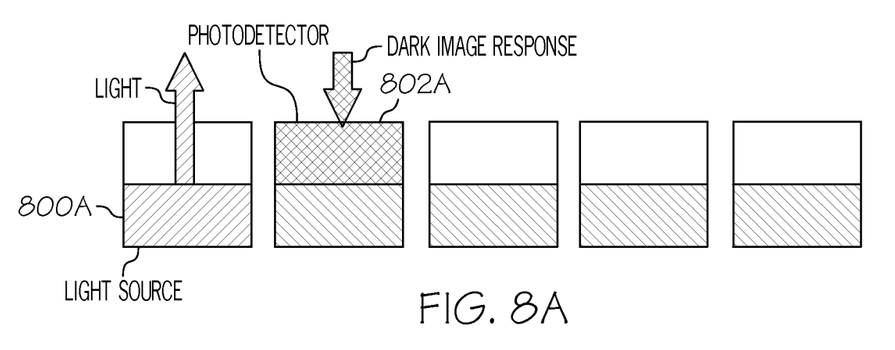
FIGS. 8A-B depict adaptive and localized illumination according to an embodiment of the present invention.
Figure 8B:
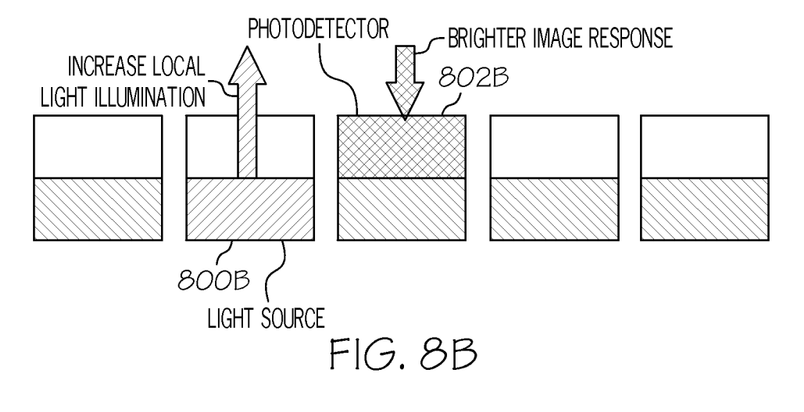

FIGS. 8A-B depict adaptive and localized illumination according to an embodiment of the present invention. When scanning a pixel or subset of pixels, a dark or light image response may be received by the photodetector. FIG. 8A shows light source 800A and photodetector 802A with a dark image response. FIG. 8B shows light source 800B and photodetector 802B with a brighter image response. In cases of the dark image response, local light illumination may be decreased by decreasing light sources and/or light intensity. In cases of a light image response, local light illumination may be increased by increasing light sources and/or light intensity.

Figure 9:
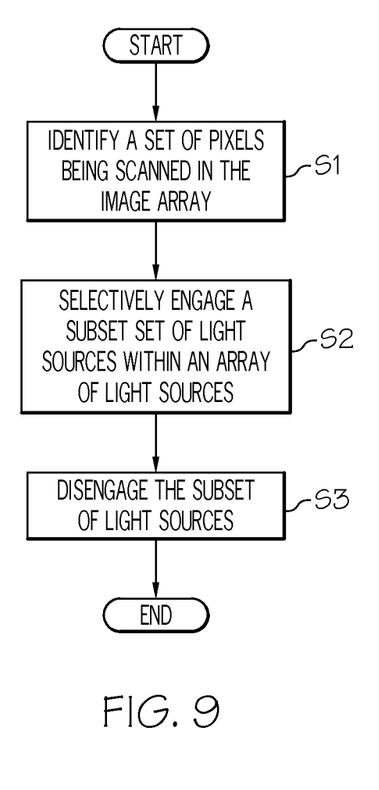
FIG. 9 depicts a process flow diagram according to an embodiment of the present invention.

FIG. 9 depicts a process flow diagram according to an embodiment of the present invention in which localized lighting for an image array is provided. First, identify a set of pixels being scanned in the image array (step S1). Second, selectively engage a subset set of light sources within an array of light sources that corresponds to the set of pixels (step S2). Third, disengage the subset of light sources when the set of pixels have been scanned (step S3).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing localized lighting for an image array, comprising:
   identifying a set of pixels being scanned in the image array;
   selectively engaging a subset of light sources within a multi-dimensional array of light sources that corresponds to the set of pixels, the array of light sources comprising a single light source per pixel in the image array; and
   disengaging the subset of light sources when the set of pixels has been scanned,
   wherein each single light source is only engaged when a single pixel corresponding to the single light source is being scanned.

2. The method of claim 1, the set of pixels being identified by at least one photodetector.

3. The method of claim 1, each light source of the subset of light sources being assigned to one of the set of pixels, wherein each pixel of the set of pixels is assigned to a different single light source.

4. The method of claim 1, further comprising:
   identifying a second set of pixels being scanned in the image array;
   selectively engaging a second subset of light sources within an array of light sources corresponding to the second set of pixels; and
   disengaging the second subset of light sources when the second set of pixels has been scanned.

5. The method of claim 1, wherein the set of pixels is identified by pixel column.

6. An imager device having localized lighting in an image array, comprising:
   an image array having a plurality of pixels arranged in rows and columns;
   a multi-dimensional array of light sources, the array of light sources comprising a single light source per pixel in the image array;
   an integrated circuit controller configured to identify a set of pixels being scanned in the image array; selectively engage a subset set of light sources within an array of light sources that corresponds to the set of pixels; and disengage the subset of light sources when the set of pixels has been scanned,
   wherein each single light source is only engaged when a single pixel corresponding to the single light source is being scanned.

7. The imager device of claim 6, further comprising at least one photodetector configured to identify the set of pixels.

8. The imager device of claim 6, each light source of the subset of light sources being assigned to one of the set of pixels, wherein each pixel of the set of pixels is assigned to a different single light source.

9. The imager device of claim 6, wherein the processing component is further configured to identify a second set of pixels being scanned in the image array; selectively engage a second subset of light sources within an array of light sources that corresponds to the second set of pixels; and disengage the second subset of light sources when the second set of pixels has been scanned.

10. The imager device of claim 6, wherein the set of pixels is identified by a pixel column.

11. A method for providing an imager device having localized lighting in an image array, comprising:
   providing an image array having a plurality of pixels arranged in rows and columns;
   providing a multi-dimensional array of light sources, the array of light sources comprising a single light source per pixel in the image array;
providing an integrated circuit controller configured to identify a set of pixels being scanned in the image array; selectively engage a subset of light sources within an array of light sources that corresponds to the set of pixels; and disengage the subset of light sources when the set of pixels has been scanned,
   wherein each single light source is only engaged when a single pixel corresponding to the single light source is being scanned.

12. The method of claim 11, further comprising providing at least one photodetector configured to identify the set of pixels.

13. The method of claim 11, each light source of the subset of light sources being assigned to one of the set of pixels, wherein each pixel of the set of pixels is assigned to a different single light source.

14. The method of claim 11, wherein the integrated circuit controller is further configured to identify a second set of pixels being scanned in the image array; selectively engage a second subset of light sources within an array of light sources that corresponds to the second set of pixels; and disengage the second subset of light sources when the second set of pixels has been scanned.

15. The method of claim 11, wherein the set of pixels is identified by pixel column.

16. An illumination system, comprising:
   a multi-dimensional array of light sources configured to provide illumination, the array of light sources comprising a single light source per pixel in the image array;
   a two-dimensional imager configured to image an area and produce image data; and
   a controller coupled to receive the image data from the imager, the controller configured to process the image data, and the controller configured to control the array of light sources,
   wherein each single light source is only engaged when a single pixel corresponding to the single light source is being scanned.

17. The illumination system of claim 16, wherein the controller is further configured to identify a set of pixels being scanned in the image array; selectively engage a subset of light sources within the array of light sources that corresponds to the set of pixels; and disengage the subset of light sources when the set of pixels has been scanned.

18. The illumination system of claim 16, each light source of the subset of light sources being assigned to one of the set of pixels, wherein each pixel of the set of pixels is assigned to a different single light source.

19. A method for providing an illumination system, comprising:
providing a two-dimensional array of light sources configured to provide illumination, the array of light sources comprising a single light source per pixel in the image array;
providing a two-dimensional imager configured to image an area and produce image data; and
providing a controller coupled to receive the image data from the imager, the controller configured to process the image data, and the controller configured to control the array of light sources,
wherein each single light source is only engaged when a single pixel corresponding to the single light source is being scanned.

20. The method of claim 19, wherein the controller is further configured to identify a set of pixels being scanned in the image array; selectively engage a subset of light sources within the array of light sources that corresponds to the set of pixels; and disengage the subset of light sources when the set of pixels have been scanned.

21. The method of claim 19, each light source of the subset of light sources being assigned to one of the set of pixels, wherein each pixel of the set of pixels is assigned to a different single light source.

* * * * *